(12) United States Patent
Lee

(10) Patent No.: US 6,456,580 B2
(45) Date of Patent: *Sep. 24, 2002

(54) DYNAMIC ABSORBER SYSTEM FOR DISC PLAYER

(75) Inventor: Wei-Pang Lee, Taipei (TW)

(73) Assignee: ASUSTek Computer Inc., Taipei (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/081,398

(22) Filed: May 19, 1998

(30) Foreign Application Priority Data

Apr. 13, 1998 (TW) .......................................... 87205457

(51) Int. Cl.⁷ .............................................. G11B 33/08
(52) U.S. Cl. ..................................................... 369/75.1
(58) Field of Search .............................. 369/75.1, 77.1, 369/77.2, 247; 360/97.01

(56) References Cited

U.S. PATENT DOCUMENTS

| | | | |
|---|---|---|---|
| 4,703,470 A | | 10/1987 | Castagna et al. ............ 369/215 |
| 5,357,500 A | * | 10/1994 | Yanagisawa ................ 369/215 |
| 5,610,892 A | * | 3/1997 | Choi ......................... 369/77.2 |

FOREIGN PATENT DOCUMENTS

| | | |
|---|---|---|
| JP | 2-260191 | 10/1990 |
| JP | 2144191 | 12/1990 |
| JP | 3-69336 | 7/1991 |
| JP | 1002168 | 1/1998 |

* cited by examiner

Primary Examiner—George J. Letscher
(74) Attorney, Agent, or Firm—Rabin & Berdo, P.C.

(57) ABSTRACT

A disc player includes a tray motion control module, a traverse module and a dynamic absorber. The tray motion control module supports the tray and, responsive to the instruction, performs in-out operation of the tray. The traverse module, via an isolator, connects to the tray motion control module. The dynamic absorber, via a damper, connects to the traverse module for absorbing the vibration caused by the rotational source on the traverse module.

2 Claims, 5 Drawing Sheets

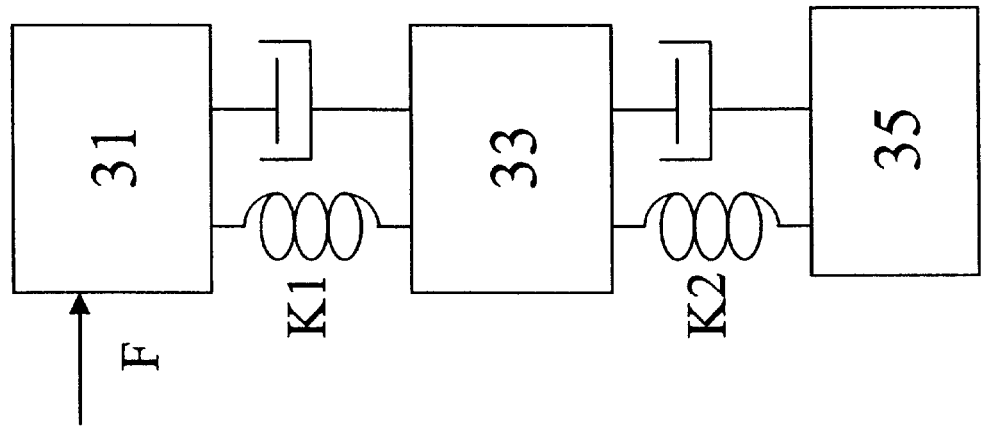
FIG.3 Prior Art
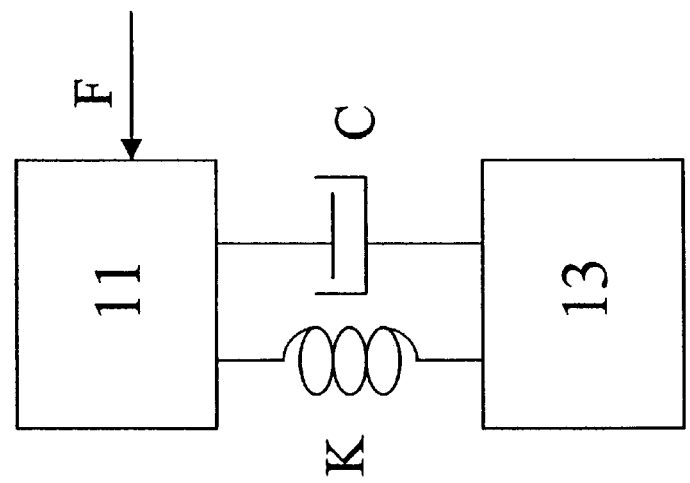
FIG.2 Prior Art
FIG.1 Prior Art

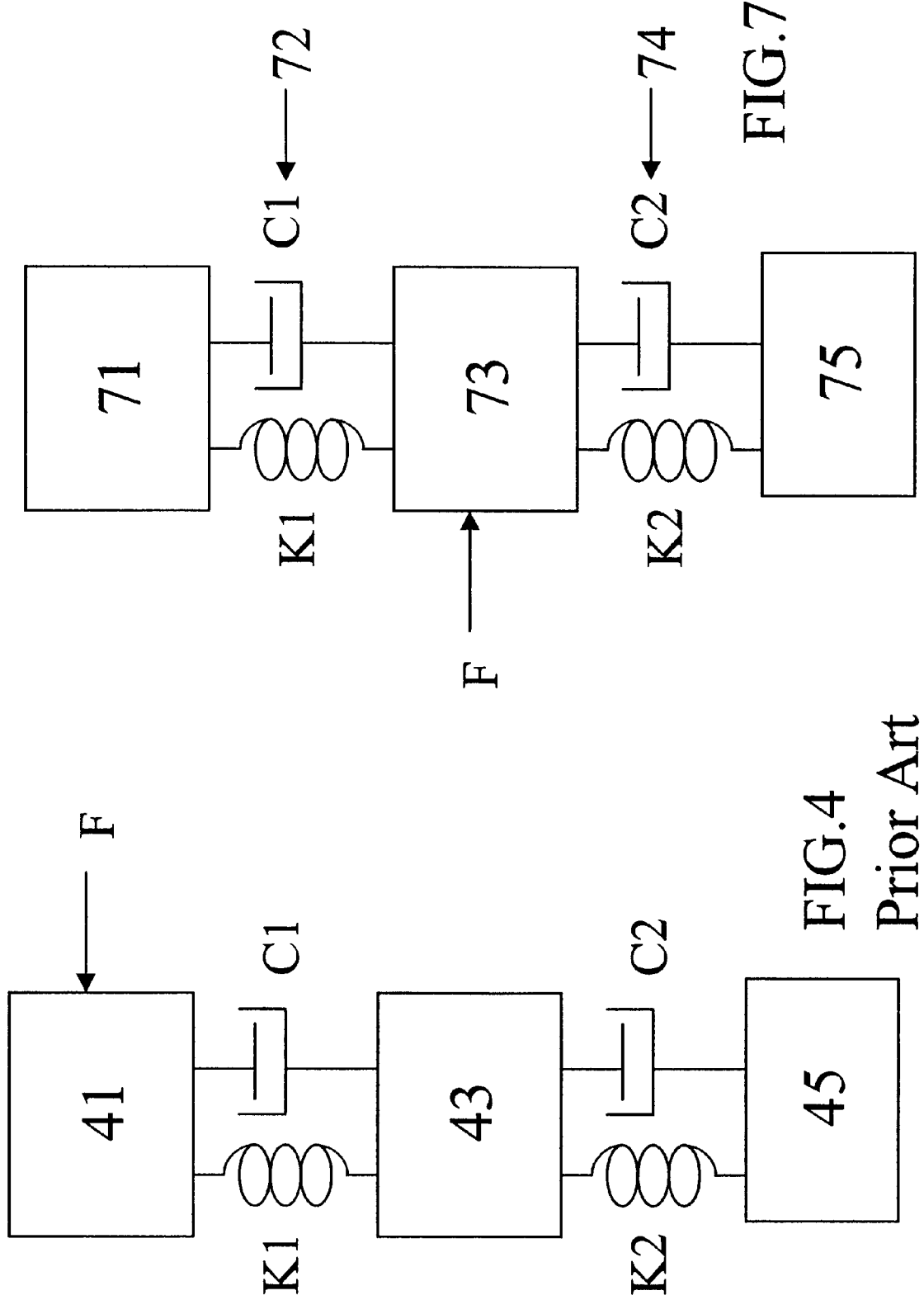

DYNAMIC ABSORBER SYSTEM FOR DISC PLAYER

FIELD OF INVENTION

The present invention relates to the dynamic absorber for disc player such as CD disc player or DVD player.

BACKGROUND OF INVENTION

It is well known that a key to achieve a much higher operation speed of a disc player is to limit the vibration generated from the rotation source within the disc player during high speed operation. Typically, there are four categories as stated below with respect to the vibration absorber system of conventional disc player.

As shown in one conventional approach of FIG. 1, a damper (K,C) is provided between the traverse module 11 and tray motion control module 13 to absorb the vibration generated thereof due to the external force F. The damper in the system functions to lower the vibration of the traverse module 11 and then stabilizes the disc read operation. However, since the resonance frequency of the design is much higher than the disc operating frequency, this design induces a much higher vibration on the casing of the disc player. In succession, the vibration of the casing of the disc player induces resonance on the computer casing which houses the disc player. As a result, during high speed operation, the computer casing give rise to a substantial noise according to this approach.

As shown in another conventional approach of FIG. 2, an isolator (K, C) is provided between the traverse module 21 and the tray motion control module 23 to perform the isolation function. The approach successfully reduces the vibration of the disc player casing. However, since the resonance frequency of this design is much lower than the disc operating frequency, this design could not transmit the vibration of the transverse module 21 outwardly and experiences a higher vibration of the traverse module 21. As a result, the disc read operation is not stable in some occasions and the disc speed must be lowered to achieve a stable read operation. It is known in the arts, the isolator differs from the damper in regard to the values of K and C. K is spring constant of the component and C is damping ratio of the component. The isolator has a smaller K value which keeps the vibration within the system generating the vibration. The damper has a bigger K value which lowers the vibration while the vibration is propagated outwardly from the system generating the vibration.

As shown in another conventional approach of FIG. 3 which adopting the concept of the dynamic absorber, the traverse module 31 is connected to the tray motion control module 33 by a damper (K1, C1), and the tray motion control module 33 is further connected to the disc player's casing 35 by an isolator (K2, C2). In other words, the tray motion control module 33, other than its conventional functions, also functions as a dynamic absorber which absorbs most of the vibration energy of the traverse module 31. The inward or outward movement of the tray (not shown) poses a clearance requirement on the corresponding contact parts of the tray motion control module 33. Therefore, a patting phenomenon is inadvertently created as a result of the tray motion control module 33 acting as the dynamic absorber.

As shown in another conventional approach of FIG. 4, a damper (K1, C1), a dynamic absorber 43 and an isolator (K2, C2) are provided between the traverse module 41 and the tray motion control module 45 to function as the vibration absorber. In this design, the dynamic absorber 43 experiences a substantial vibration while the traverse module 41 and the tray motion control module 45 achieves a much lower vibration. It is important to note that the dynamic absorber 43 is disposed between the traverse module 41 and the tray motion control module 45. Therefore, as the disc player is disposed vertically during operation, the dynamic absorber 43 will be in contact with the tray motion control module 45 due to gravity effect. And due to the vibration of the dynamic absorber 43 is substantial, knocking or patting between the dynamic absorber 43 and the tray motion control module 45 will also be substantial. As the result, during high speed operation, not only the noise thereof is annoying to the user, but the resonance of the computer system's housing is undesiredly created. On the other hand, the damper (K1, C1) as well as the isolator (K2, C2) are made of the deformable rubber material upon which the assembly dimension accuracy is difficult to impose. An, in this design, dimension tolerances of the damper, isolator, the dynamic absorber and the assembly relationship inherently exist between the traverse module 41 and the tray motion control module 45. In overall, the effective vibration absorbing capability of this design heavily depends on the control of the dimension tolerances mentioned above.

Due to the drawbacks recited above with respect to the conventional approaches, the present invention intends to provide a simple and effective way to lower the vibration associating with high speed operation of the disc player without the drawbacks mentioned above.

SUMMARY OF INVENTION

A disc player is provided to include a tray motion control module, a traverse module and a dynamic absorber. The tray motion control module supports the tray and, responsive to the instruction, performs in-out operation of the tray. The traverse module, via an isolator, connects to the tray motion control module. The dynamic absorber, via a damper, connects to the traverse module for absorbing the vibration caused by the rotational source on the traverse module. The damper with high damping value transmits most vibration energy from traverse module to dynamic absorber to lower the traverse's vibration. The isolator keeps the vibration within the traverse module.

BRIEF DESCRIPTION OF THE APPENDED DRAWINGS

FIG. 1 shows one conventional approach in form of system diagram.

FIG. 2 shows another conventional approach in form of system diagram.

FIG. 3 shows still another conventional approach in form of system diagram.

FIG. 4 shows still another conventional approach in form of system diagram.

Figure 5:
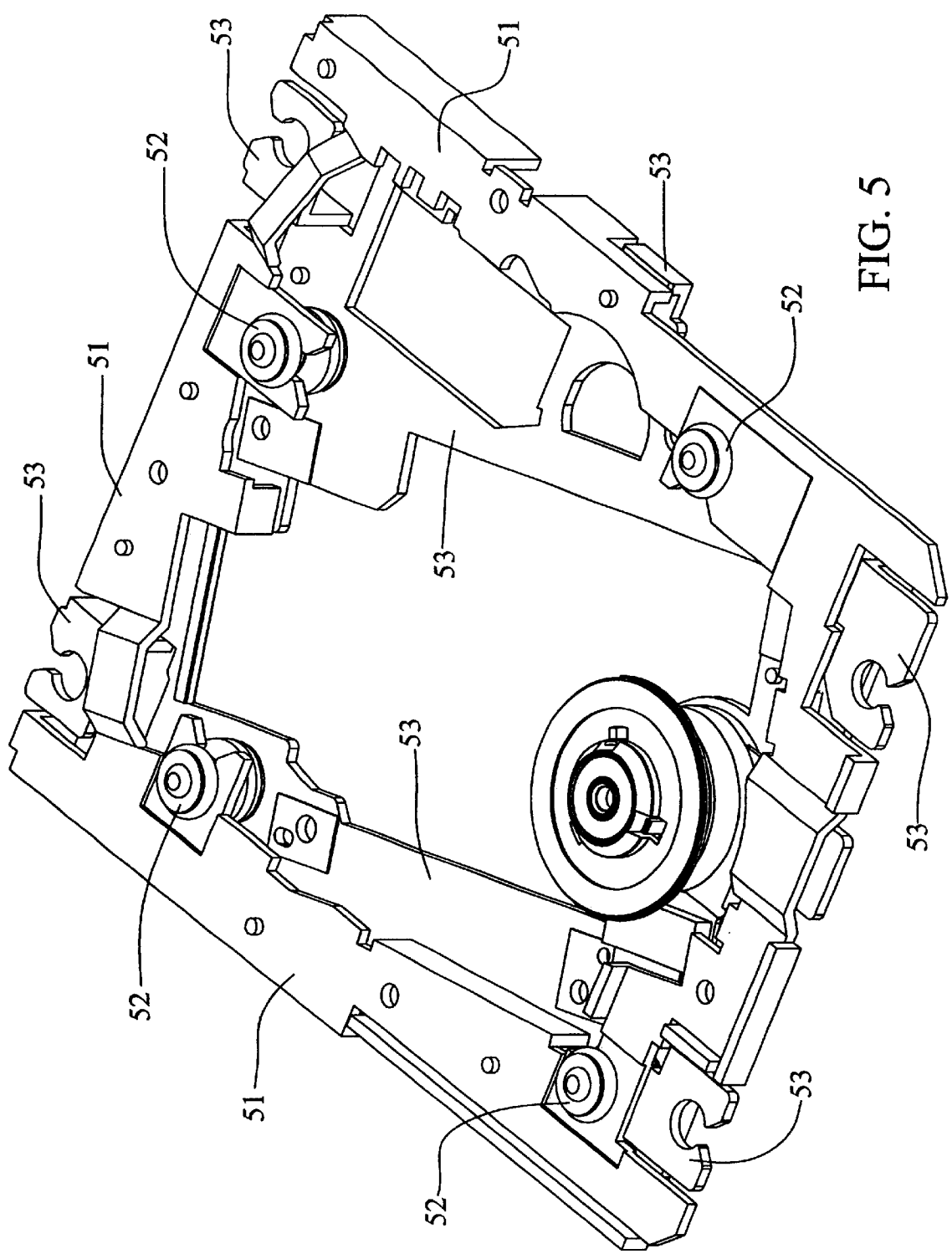

FIG. 5 shows the connection relationship between the dynamic absorber 51, the traverse module 53 and the damper 52 in accordance with the invention.

Figure 6:
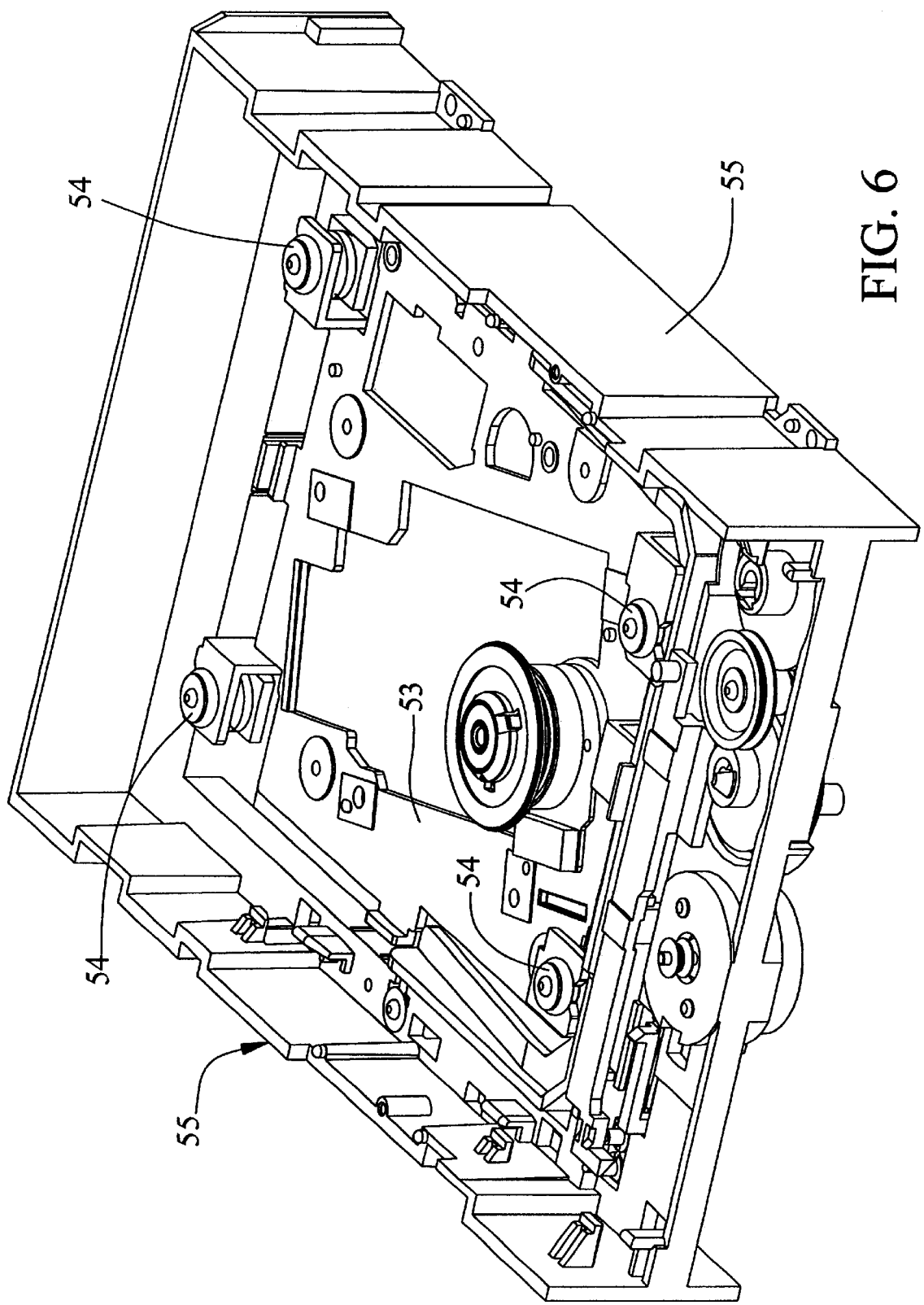

FIG. 6 shows the connection relationship between the traverse module 53, the tray motion control module 55 and the isolator 54 in accordance with the invention.

FIG. 7 depicts the present invention in form of system diagram.

Figure 8:
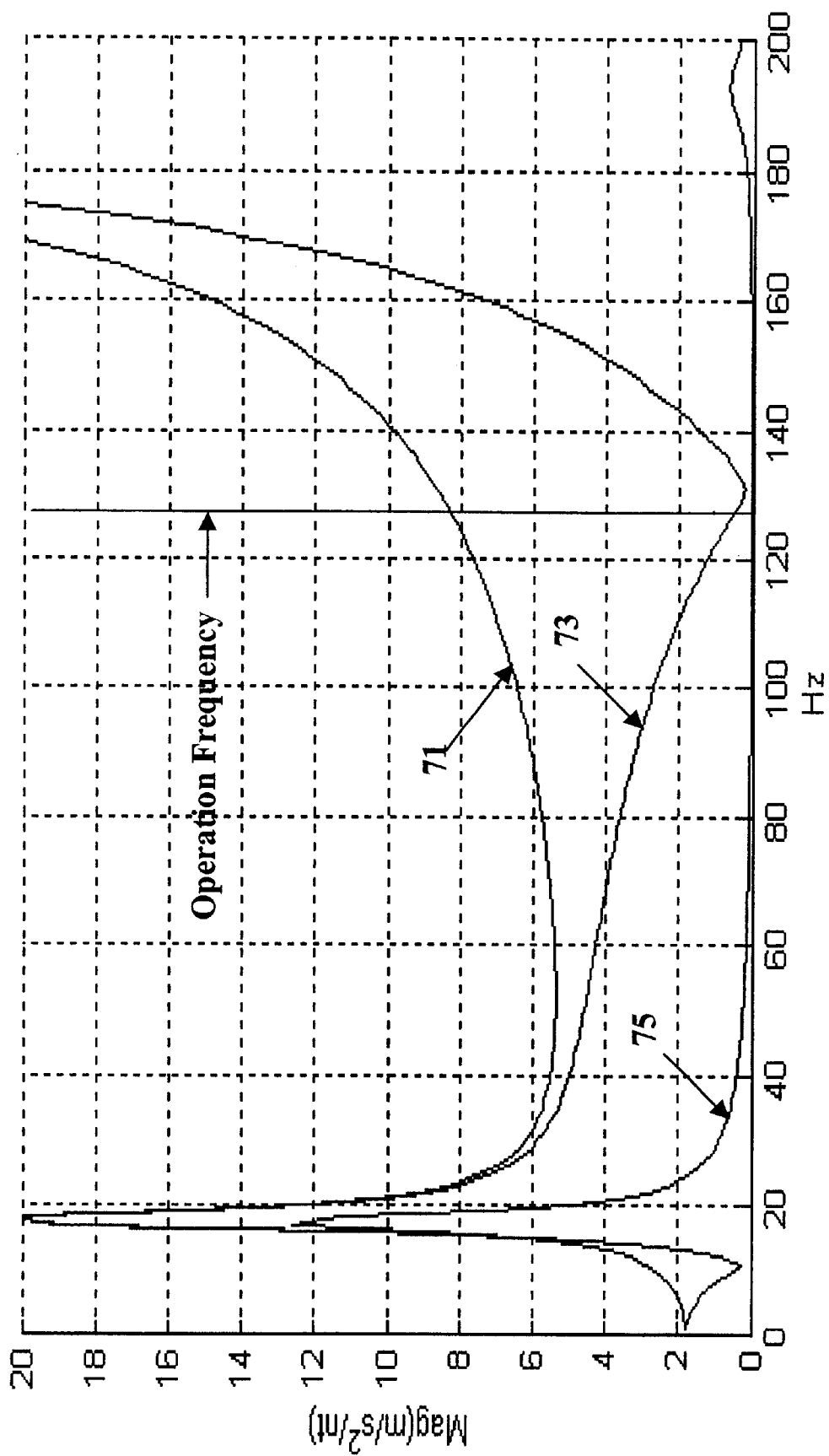

FIG. 8 is an exemplary system's frequency response in regard to the traverse module 73, the tray motion control module 75 and the dynamic absorber 71 in FIG. 7.

DETAILED DESCRIPTIONS OF THE PREFERRED EMBODIMENT

As shown in FIG. 5 and FIG. 6, a vibration absorber system of the invention employs a dynamic absorber 51 connected to the traverse module 53 by a damper 52 (K1, C1), and employs an isolator 54 (K2, C2) connecting the traverse module 53 with the tray motion control module 55. In FIG. 5 and FIG. 6, only main structure of the traverse module 53 and the rotational shaft driving the disc are shown while the pickup head thereon is not shown for clarity purpose. In this invention, the dynamic absorber 51 is defined as a vibration or shock absorber which is capable of moving in a large scale relative to the component it is connected and/or of absorbing most of the vibration or shock energy during operation of the disc player. The isolator 54 has a smaller K value which keeps the vibration within the system generating the vibration. The damper 52 has a bigger K value which lowers the vibration while the vibration is propagated outwardly from the system generating the vibration. It is important to note that the present invention employs the dynamic absorber 51 as a main component absorbing energy of vibration from the disc player. Under this design, even when the disc player is disposed vertically when operating, the dynamic absorber 51 does not contact with the tray motion control module 55 and avoids the drawback in association with the conventional approach shown in FIG. 4. This arrangement reduces the vibration of the traverse module 53 and allows a stable read operation of the disc. Furthermore, vibration force propagated to the tray motion control module 55 is also minimized to prevent patting noise and resonance with regard to the computer system's casing.

The dimension relationship between the traverse module 53 and the tray motion control module 55 is controlled by the dimension of the single isolator 54 in this invention as compared with one damper and one isolator of conventional approach shown in FIG. 4. Therefore, it is easier to obtain a designed dimension relationship, during manufacture, between the traverse module 53 and the tray motion control module 55 for the present invention.

In form of the system diagram, the invention is shown in FIG. 7 in which the damper (K1, C1) is denoted as 72 and the isolator (K2, C2) is denoted as 74. The numeral 71 represents the dynamic absorber, the numeral 73 represents the traverse module and the numeral 75 represents the tray motion control module. In the past, the traverse module 73 is made and sold by manufacturer to the makers of the disc player. The makers of the disc player then implement their own vibration reduction system within the disc player. By the present invention, the assembly form of the traverse module 73 with the dynamic absorber 71 may be made and sold to the makers of disc player. This arrangement saves time and resource of the disc player makers in implementing conventional vibration reduction system. Therefore, the traverse module 73 together with the dynamic absorber 71 may be regarded as a traverse module with self vibration-absorbing capability. From the frequency responses, which is shown in FIG. 8, of the components of the invention, it is apparent that the invention achieves the object of the invention as desired.

What is claimed is:

1. A disc player comprising:
    a tray motion control module for supporting a disc tray, the tray motion control module, responsive to an instruction, performing feed-in or ejection-out motion of the disc tray;
    a traverse module connected to the tray motion control module via an isolator, the traverse module being provided with a rotation source which generates vibration during disc operation of the disc player, wherein the isolator has a first K value representing a spring constant of the isolator to keep the vibration within a system generating the vibration;
    a vibration absorber directly connected to the traverse module only via a damper for absorbing vibration energy from the rotation source, wherein the damper has a second K value, larger than said first K value, representing a spring constant of the damper to lower the vibration while the vibration is propagated outwardly from the system generating the vibration.

2. The player of claim 1, wherein the vibration absorber is capable of moving relative to the traverse module in a large scale during operation of the disc player.

* * * * *